(12) United States Patent
Aguilar et al.

(10) Patent No.: US 6,691,195 B1
(45) Date of Patent: Feb. 10, 2004

(54) COMPACT DIAGNOSTIC CONNECTOR FOR A MOTHERBOARD OF DATA PROCESSING SYSTEM

(75) Inventors: Maximino Aguilar, Austin, TX (US); Sanjay Gupta, Austin, TX (US); Roy Moonseuk Kim, Austin, TX (US); Yuan-Chang Lo, Austin, TX (US); James Michael Stafford, Round Rock, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/519,340

(22) Filed: Mar. 6, 2000

(51) Int. Cl.[7] .................. G06F 13/24; G06F 11/00; G06F 9/00
(52) U.S. Cl. .................. 710/260; 714/25; 713/2
(58) Field of Search .................. 710/100, 301, 710/260; 307/156; 324/754; 713/2, 323; 714/25, 795; 370/525; 73/779; 345/502

(56) References Cited

U.S. PATENT DOCUMENTS

| | | | | |
|---|---|---|---|---|
| 4,654,820 A | * | 3/1987 | Brahm et al. ............. | 710/260 |
| 4,904,935 A | * | 2/1990 | Calma et al. .............. | 324/754 |
| 5,127,004 A | * | 6/1992 | Lenihan et al. ............ | 370/525 |
| 5,333,273 A | * | 7/1994 | Raasch et al. ............. | 710/67 |
| 5,440,181 A | * | 8/1995 | Gruender et al. .......... | 307/156 |
| 5,659,680 A | * | 8/1997 | Cunningham et al. ...... | 714/25 |
| 5,765,004 A | * | 6/1998 | Foster et al. .............. | 713/323 |
| 5,815,706 A | * | 9/1998 | Stewart et al. ............ | 713/2 |
| 5,848,278 A | * | 12/1998 | Sakai ...................... | 710/260 |
| 5,878,248 A | * | 3/1999 | Tehranian et al. ......... | 345/502 |
| 5,929,646 A | * | 7/1999 | Patel et al. ............... | 324/754 |
| 6,113,260 A | * | 9/2000 | Genrich et al. ............ | 714/795 |
| 6,405,599 B1 | * | 6/2002 | Patt ......................... | 73/779 |

* cited by examiner

Primary Examiner—Tim Vo
(74) Attorney, Agent, or Firm—Bracewell & Patterson

(57) ABSTRACT

A compact connector for a data processing system motherboard facilitates the performance of diagnostics on data processing system components. The connector includes first, second, and third terminals in communication with respective first, second, and third lines in the motherboard for serial port interrupts, system data, and keyboard interrupts, respectively. In an illustrative embodiment, the first and second lines comprise lines of an Industry Standard Architecture (ISA) bus, and the compact connector also includes a fourth terminal in communication with a fourth line in the motherboard for real-time-clock interrupts. This embodiment allows the motherboard to receive real-time-clock interrupts via the connector, so that a startup program of the data processing system may boot to an operating system that requires a real-time-clock. That operating system may then be utilized to test the motherboard. In addition, this embodiment allows one or more input devices in communication with the connector to be utilized to interact with the motherboard.

9 Claims, 3 Drawing Sheets

COMPACT DIAGNOSTIC CONNECTOR FOR A MOTHERBOARD OF DATA PROCESSING SYSTEM

BACKGROUND OF THE INVENTION

1. Technical Field

The present invention relates to data processing systems and, in particular, to data processing system motherboard interfaces. Specifically, the present invention relates to a motherboard connector that supports the performance of diagnostics on data processing system components while occupying only a small portion of the surface of the motherboard, and to a method and system for utilizing such a connector.

2. Description of the Related Art

Conventional personal computer systems (PCs) include a central processing unit (CPU), one or more memory modules, and a motherboard into which the CPU and memory modules are inserted. A chipset mounted to the motherboard by the manufacturer provides core logic that operatively links the CPU, the memory modules, and other components of the system. A read only memory (ROM) chip containing the system's startup program (firmware) is also mounted to the motherboard.

A conventional PC typically also includes input and output (I/O) devices (e.g., a keyboard and a video display), as well as one or more floppy and/or hard disk drives, which are also connected to the motherboard, oftentimes via intermediate adapters. Most general-purpose PCs in operation today also include a dedicated serial port, a dedicated keyboard port, and one or more expansion slots configured to receive expansion cards for augmenting; the PC's functionality. For example, a network expansion card can be inserted into an expansion slot of a general-purpose PC to provide a port for connecting that PC to a local area network (LAN).

When a PC is started, the CPU automatically executes the startup program, which loads and activates a basic input and output system (BIOS) that supports communication between the CPU and the I/O devices. The startup program then loads and activates an operating system (OS) which provides an interface to the hardware of the PC for software applications such as network client software, word processors, web browsers, etc.

Some OSs (such as DOS) provide a relatively simple and limited set of commands for utilizing the PC's hardware. Perhaps the most widely utilized variety of DOS is the OS that has been distributed (in numerous versions) since approximately 1980 by Microsoft Corporation under the trademark MS-DOS. An important characteristics of DOS is that it can operate within systems having relatively limited data storage facilities. Other OSs provide more complex functionality, such as support for networking, security, and/or multi-tasking. However, relative to DOS, these more advanced OSs also require additional hardware resources, particularly the data storage facilities utilized to hold the OS while the system is powered down and the data storage facilities utilized by the OS when the system is active. Examples of such advanced OSs include the OS developed by American Telephone and Telegraph Company and distributed under the trademark UNIX, the OS distributed by International Business Machines Corporation (IBM) under the trademark AIX, other "UNIX-like" OSs, the OS distributed by IBM under the trademark OS/2, and the OSs distributed by Microsoft Corporation under the trademarks WINDOWS 95, WINDOWS 98, and WINDOWS NT.

While a general purpose PC may be customized to fill particular computing needs, advances in technology and changes in the computer market have resulted in the development of special-purpose PCs that differ in configuration from general-purpose PCs. For example, in response to demand for PCs to serve solely as network clients, manufacturers have recently begun producing PCs with motherboards having built-in (or "onboard") networking circuitry. Further, in order to reduce the complexity and cost of such PCs, and to make room on the motherboard for the necessary onboard components, manufacturers are omitting from those PCs legacy features such as expansion slots and disk drives. These PCs, which are called "thin clients," "diskless workstations," "network appliances," or "Internet appliances," may even lack dedicated keyboard and serial ports, instead utilizing one or more Universal Serial Bus (USB) ports. (As explained in the Universal Serial Bus Specification Revision 1.1, which may be found on the Internet at http://www.usb.org, and which is hereby incorporated by reference, USB ports employ two data lines that carry data as complementary voltage signals). Furthermore, unlike general purpose PCs, which usually load an operating system from a local hard disk (or other local data storage), when some thin clients are started or restarted (i.e., booted), they automatically load the OS from a remote server. Furthermore, thin clients often do not load DOS, but instead load some other OS (e.g., a UNIX-like OS).

Although it can be appreciated that thin clients provide a cost effective solution to particular computing needs, the lack of legacy features in such systems presents difficulties where execution of applications that perform system diagnostics is concerned. Those difficulties exist because many existing programs for testing PCs are designed to run under DOS and to utilize legacy I/O facilities, but many thin clients do not boot to DOS and do not have legacy I/O ports. Significant time and expense would be required to rewrite existing DOS-based test programs for other OSs. In addition, new system hardware is typically available before any new OS for that hardware, or any new application designed to run under the new OS, have been written. Consequently, what is needed is a way to test thin clients without incurring the delays and expense associated with rewriting existing testing applications for new OSs and without to substantially increasing manufacturing costs. The present invention addresses that need.

SUMMARY OF THE INVENTION

The present invention introduces a compact connector, for a data processing system motherboard, that facilitates the performance of diagnostics on data processing system components. The connector includes first, second, and third terminals in communication with respective first, second, and third lines in the motherboard for serial port interrupts, system data, and keyboard interrupts, respectively.

In an illustrative embodiment, the first and second lines comprise lines of an Industry Standard Architecture (ISA) bus, and the compact connector also includes a fourth terminal in communication with a fourth line in the motherboard for real-time-clock interrupts. This embodiment allows the motherboard to receive real-time-clock interrupts via the connector, so that a startup program of the data processing system may boot to an operating system that requires a real-time-clock. That operating system may then be utilized to test the motherboard. In addition, this embodiment allows one or more input devices in communication with the connector to be utilized to interact with the motherboard.

All objects, features, and advantages of the present invention will become apparent in the following detailed written description.

DESCRIPTION OF THE DRAWINGS

The novel features believed characteristic of the invention are set forth in the appended claims. The invention itself, however, as well as a preferred mode of use and further objects, and advantages thereof, will best be understood by reference to the following detailed description of an illustrative embodiment when read in conjunction with the accompanying drawings, wherein:

FIG. 4 illustrates pinout diagrams of the expansion slot and auxiliary signal junction of the mezzanine board of FIG. 3.

DETAILED DESCRIPTION OF ILLUSTRATIVE EMBODIMENT

Figure 1:
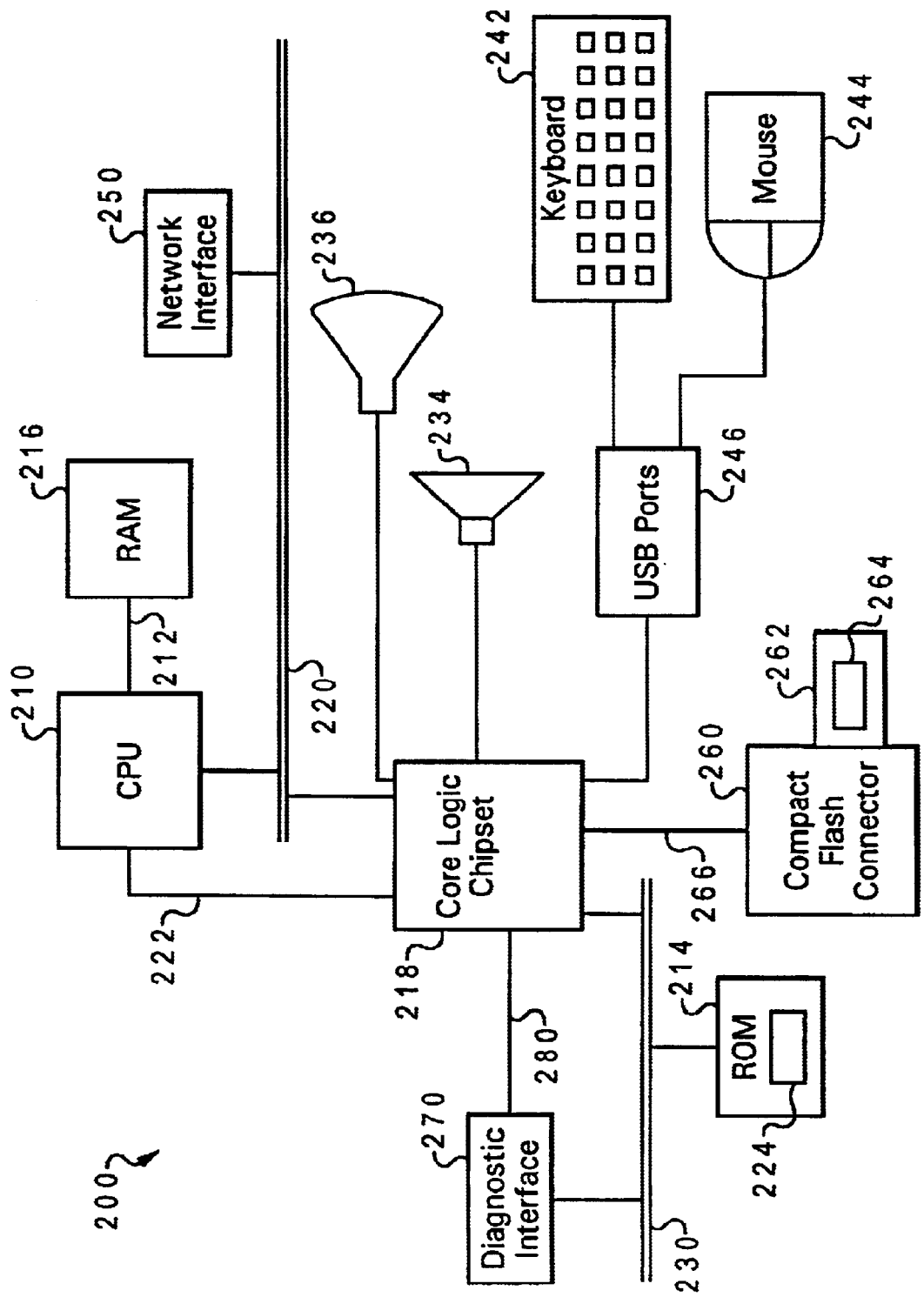
FIG. 1 depicts a block diagram of an illustrative data processing system of the thin client variety, the data processing system including facilities for utilizing legacy diagnostic applications in accordance with the present invention, including a compact diagnostic connector.

With reference now to the figures, and in particular with reference to FIG. 1, there is depicted a block diagram of a data processing system 200 with facilities, in accordance with the present invention, for utilizing legacy diagnostic applications. In particular, data processing system 200 of the illustrative embodiment is designed to be operated as a client work station within a wide area network (WAN) or LAN that has one or more servers which store and which may execute applications for clients such as data processing system 200. Data processing system 200 is therefore configured as a thin client, omitting many of the components that are usually included in stand alone systems (such as a hard disk drive), and utilizing a motherboard with onboard subsystems for certain functions that traditionally have been supported by expansion cards.

As illustrated, however, data processing system 200 does include a central processing unit (CPU) 210, which is connected to random access memory (RAM) 216 via a memory bus 212. CPU 210 is also connected to a core logic chipset 218 via both a Peripheral Component Interconnect (PCI) local bus 220 and an auxiliary video bus 222. In addition, a read-only memory (ROM) 214 containing a startup program 224 is connected to core logic chipset 218 via an Industry Standard Architecture (ISA) bus 230. Memory bus 212, PCI local bus 220, auxiliary video bus 222, and ISA bus 230 reside within a motherboard (not illustrated). CPU 210, RAM 216 and the various other onboard components are mounted to the motherboard during manufacture or assembly of data processing system 200.

Data processing system 200 also includes a speaker 234 and a display device 236 for audio and video output, respectively. However, unlike conventional PCs that utilize expansion cards for video and audio output, audio and video output are controlled in data processing system 200 by onboard subsystems of core logic chipset 218.

Also included is a network interface 250 for linking data processing system 200 to other stations of a LAN (not illustrated). For example, network interface 250 may be an Ethernet interface for establishing connections to a LAN, an internal modem for establishing dial-up connections to an Internet service provider (ISP), or any comparable type of communications interface. Preferably, network interface 250 is implemented as an onboard network interface subsystem mounted to the motherboard in communication with PCI bus 220, but alternative configurations (such as an expansion card connected to a PCI or compact PCI expansion slot) are also possible. Data processing system 200 preferably includes no more than one expansion slot, however, as it is desirable to minimize the cost of data processing system 200, as well as its footprint, and the essential onboard components leave very little room for additional expansion slots.

Data processing system 200 is designed to receive operator input (from input devices such as a USB keyboard 242 and a USB mouse 244) via one or more USB ports 246 connected to core logic chipset 218. However, data processing system 200 has no legacy keyboard port (e.g, a keyboard port conforming to the AT or PS/2 conventions, which include only one data line). Data processing system also has no legacy serial port and no hard disk drive.

Accordingly, startup program 224 is designed to load an OS from a remote server when data processing system 200 is booted. Specifically, in the illustrative embodiment, startup program 224 downloads a UNIX-like OS (such as the OS distributed by Liberate Technology under the trademark NCIOS) from a remote server (not illustrated) via network interface 250. A startup parameter identifying the server is stored in a complementary metal-oxide semiconductor (CMOS) or equivalent memory (not illustrated) of data processing system 200. A network client application that allows data processing system 200 to interact with one or more application servers that execute applications (such as word processors, Web browsers, etc.) on behalf of clients is then started.

In the illustrative embodiment, data processing system 200 also includes an interface for an auxiliary startup medium, such as a compact flash connector 260 for a compact flash card 262. Compact flash connector 260 is a connected to core logic chipset 218 via an Integrated Device Electronics (IDE) bus 266. Compact flash card 262 contains both an auxiliary startup program 264 and DOS.

In the engineering and manufacturing phases of production, when it is necessary to validate and debug the hardware, data processing system 200 is booted with compact flash card 262 connected to compact flash connector 260. This causes core logic chipset 218 to utilize auxiliary startup program 264 in lieu of startup program 224. Auxiliary startup program 264 causes the system to boot DOS. Consequently, DOS-based system test programs may be executed on data processing system 200. However, such programs support I/O via legacy keyboards and legacy serial ports, but they do not support USB keyboards or USB serial I/O.

Therefore, in accordance with the present invention, the motherboard also includes a compact diagnostic connector 270 that supports a legacy keyboard and legacy serial I/O, as well as a real-time clock. Compact diagnostic connector 270 thus enables data processing system 200 to execute DOS-based applications (such as system test programs) effectively.

In the illustrative embodiment, compact diagnostic connector 270 is connected to core logic chipset 218 via certain communication paths within the motherboard, specifically via ISA bus 230 and an auxiliary diagnostic bus 280. However, in keeping with the physical constraints imposed on thin clients, compact diagnostic connector 270 occupies only a small portion of the surface of the motherboard. In the illustrative embodiment, to minimize the footprint of compact diagnostic connector 270 while providing sufficient support for DOS-based applications, only forty terminals are included.

Figure 2:
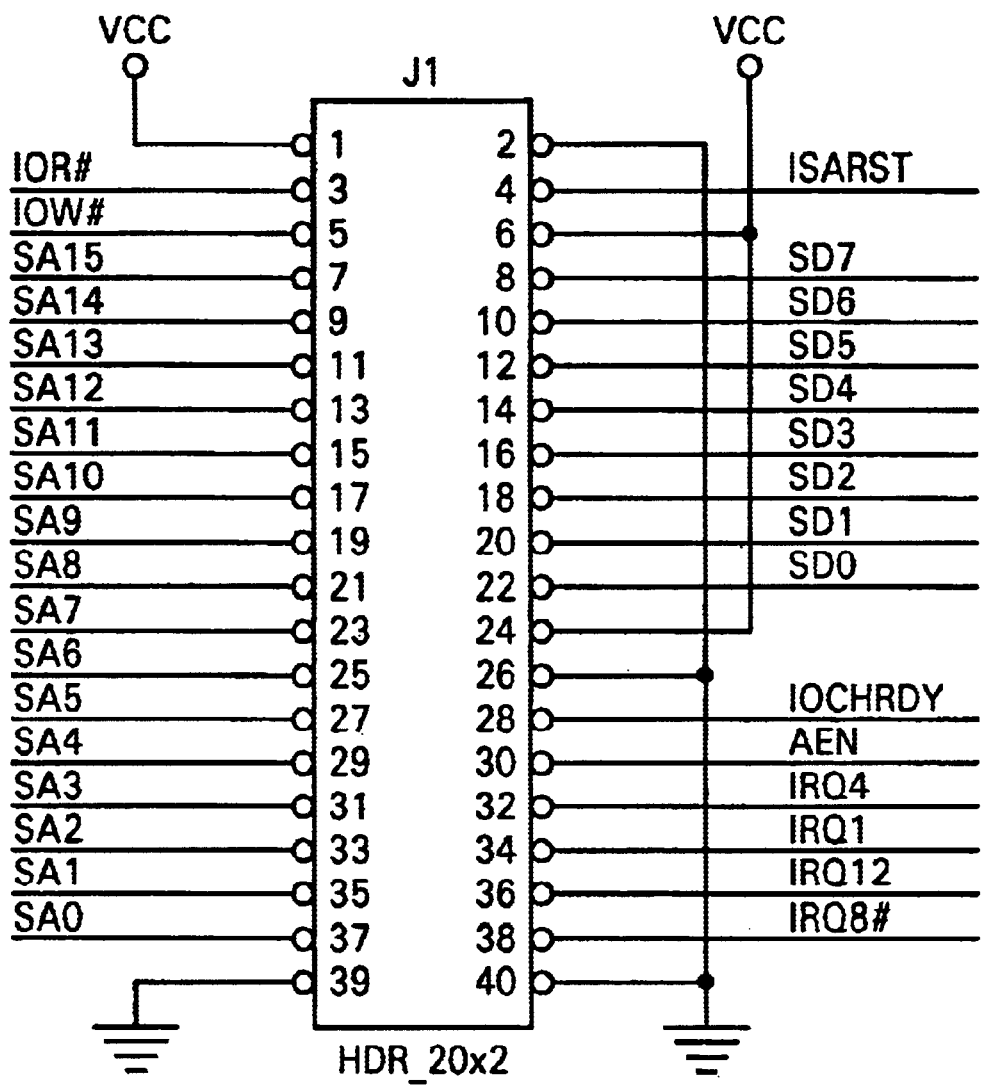
FIG. 2 illustrates a pinout diagram of the compact diagnostic connector depicted in FIG. 1.

With reference now to FIG. 2, there is illustrated a pinout diagram of compact diagnostic connector 270. As shown, terminals 1, 6, and 24 are connected to a source of 5 volt power and terminals 2, 26, 39, and 40 are connected to ground. Of the remaining 33 terminals, 31 are connected to lines of ISA bus 230 and two are connected to lines of auxiliary diagnostic bus 280.

The 31 terminals connected to ISA bus 230 are as follows. Terminals 3 and 5 are respectively connected to the I/O read and I/O write lines, while terminal 4 is connected to the ISA reset line and terminal 28 is connected to the I/O channel ready line. Also, terminal 30 is connected to the address enable line, while terminals 32 and 36 are connected to the IRQ4 (serial port interrupt) and IRQ12 (mouse interrupt) lines. The 16 odd-numbered terminals from 7 through 37 are connected, respectively, to lines for system address (SA) bits 15 through 0. Similarly, the eight even-numbered terminals from 8 through 22 are connected to lines for system data (SD) bits 7 through 0, respectively.

The two terminals connected to auxiliary diagnostic bus 280 are terminals 34 and 38, which are linked to respective inputs of core logic chipset 218 for IRQ1 (keyboard interrupts) and IRQ8 (real-time clock, or "RTC," interrupts). When used in conjunction, the 40 terminals of compact diagnostic connector 270 allow operators to interact with data processing system 200 via DOS-based application, utilizing DOS-supported I/O devices (such as a legacy keyboard and a legacy serial port).

In a first embodiment, compact diagnostic connector 270 is presented on the surface of the motherboard as a rectangular block including 40 terminal pads arranged in 2 columns of 20 rows. The block is 0.25 inches wide and 0.75 inches long, with the columns extending along the length of the block. System tests are performed via a test jig that is placed into contact with the pads. Operators interact with system tests executing on data processing system 200 via testing equipment (such as a keyboard, a display device, and/or a source of serial test data) in communication with the test jig. Thus, according to the first embodiment, a compact diagnostic connector 270 is provided that adds little to the cost of data processing system 200 and that may be utilized to test system hardware even though keyboard 242, display device 236, and/or other components have not yet been attached to the subsystems of the motherboard that support those components, or even before the subsystems for those components have been mounted to the motherboard.

Figure 3:
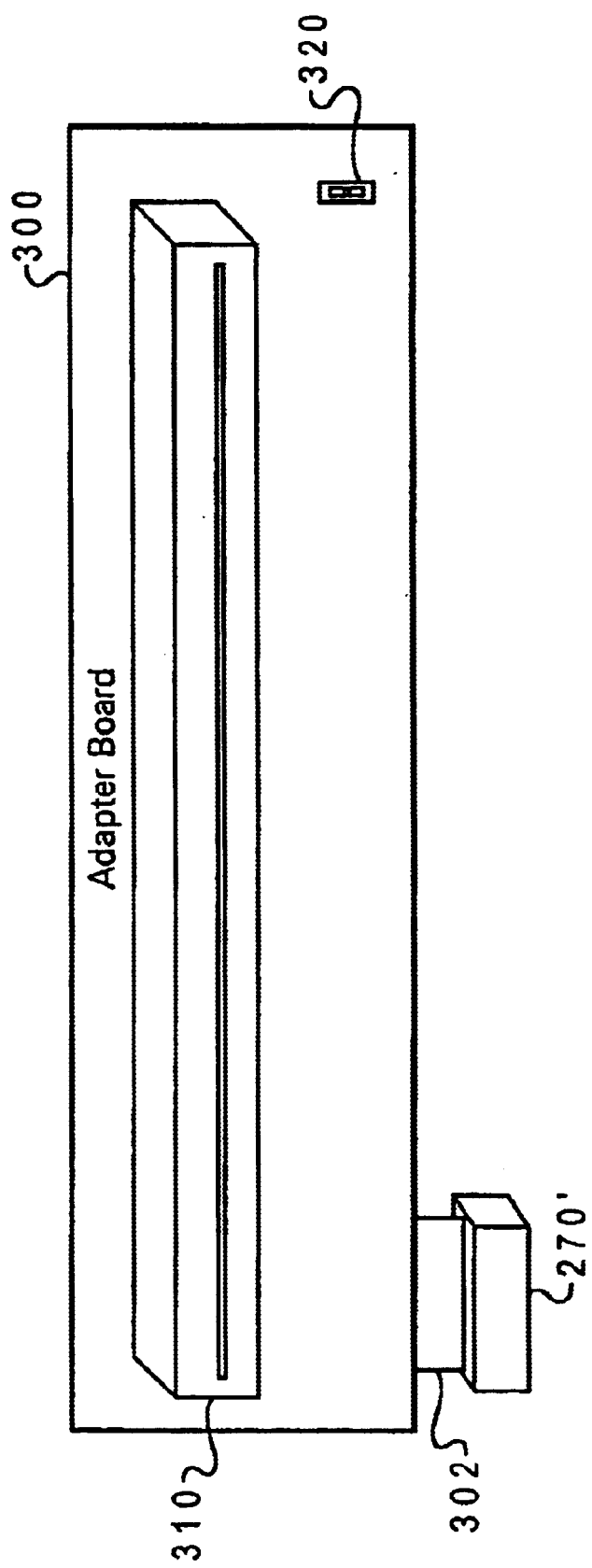
FIG. 3 depicts an exemplary mezzanine board for linking a legacy expansion card to a compact diagnostic connector according to the present invention.

In a second embodiment, the terminals of compact diagnostic connector 270 are presented within a compact expansion slot that is small enough to fit on the motherboard with all of the other components. With reference now to FIG. 3, there is depicted an isometric view of an illustrative embodiment of such a compact expansion slot, designated with reference numeral 270'. In addition, FIG. 3 illustrates an illustrative embodiment of a corresponding mezzanine board 300 that provides a physical bridge between compact expansion slot 270' and a conventional adapter card.

As suggested by FIG. 3, in the illustrative embodiment, compact expansion slot 270' contains first and second interior walls supported by a rectangular housing that has a width of 6.3 millimeters (0.25 inches), a length of 19.1 millimeters (0.75 inches), and a height of 6.3 millimeters (0.25 inches). The 40 terminals are disposed 20 on the first side and 20 on the second side, in accordance with the pinout diagram illustrated in FIG. 2. These terminals are positioned to contact corresponding terminals on a tongue 302 extending from one edge of mezzanine board 300. Accordingly, tongue 302 is approximately 19.1 millimeters (0.75 inches) long and approximately 10.2 millimeters (0.4 inches) high. The remainder of mezzanine board 300 is approximately 41.3 millimeters (1.625 inches) high and 158.8 millimeters (6.25 inches) long. Mounted on a side of mezzanine board 300 are a conventional ISA expansion slot 310 and an auxiliary signal junction 320. Also, it should be noted that the elements of FIG. 3 are illustrated substantially to scale, to portray clearly the diminutive nature of compact expansion slot 270', relative to conventional expansion slots such as ISA expansion slot 310.

With reference to FIG. 4, there is depicted a pinout diagram of ISA expansion slot 310, revealing that ISA expansion slot 310 preferably contains the 98 standard ISA 25 terminals. As FIG. 4 also indicates, auxiliary signal junction 320 contains two terminals, one for IRQ1 (keyboard interrupts) and the other for IRQ8 (RTC interrupts).

To utilize a DOS-based diagnostic program on data processing system 200 in accordance with the second embodiment, tongue 302 of mezzanine board 300 is inserted into compact expansion slot 270'. Also, a conventional ISA card (not illustrated) that supports a legacy keyboard (not illustrated) and a legacy serial port (not illustrated), and that provides a real-time clock, is inserted into ISA expansion slot 310. Such cards are commonly know as Super I/O cards and are distributed by National Semiconductor Corp., for example.

In addition, lines are run from IRQ1 and IRQ8 outlets on the ISA card to corresponding terminals of the auxiliary signal junction 320. Also, a legacy keyboard and a serial device utilizing legacy serial port conventions are plugged into the ISA card that has been inserted into ISA expansion slot 310. Once all of the connections have been made and compact flash card 262 has been inserted into compact flash connector 260, data processing system 200 is booted. During the startup process, startup pro gram 264 will detect the legacy keyboard via compact expansion slot 270'. Startup program will then attempt to load and activate DOS (i.e., boot to DOS). Since compact expansion slot 270' forwards IRQ8 (RTC interrupt) signals from the ISA card to core logic chipset 218, that attempt should succeed. After data processing system 200 has booted to DOS, the start program may invoke the diagnostic program, or that program may be invoked via the legacy keyboard and serial port. In addition, the legacy keyboard may be used to control the diagnostic program.

In conclusion, as has been described, the present invention provides a convenient means for booting systems that lack support for legacy features (such as legacy keyboards and serial ports) to DOS and for facilitating effective utilization of DOS-based programs to validate and debug such systems. In an illustrative embodiment, a compact diagnostic connector includes terminals for keyboard, serial port, and real-time clock interrupts, but occupies only a small portion of the surface of the motherboard.

While the invention has been described with reference to an illustrative embodiment, this description is not meant to be construed in a limiting sense. For example, although the illustrative embodiment involves PC with a particular hardware architecture, those of ordinary skill in the art will appreciate that the present invention could as well be utilized to advantage in data processing systems with alternative architectures. Furthermore, additional changes to the form and details of the disclosed embodiments, as well as alternative embodiments of the invention, will become apparent to persons skilled in the art upon reference to the description of the invention. It is therefore contemplated that such modifications can be made without departing from the spirit and scope of the present invention as defined in the appended claims.

What is claimed is:

1. An apparatus that facilitates the performance of diagnostics on data processing system components, said apparatus comprising:
    a connector for a motherboard for a data processing system;
    a first terminal within said connector in communication with a first line in said motherboard for serial port interrupts;
    a second terminal within said connector in communication with a second line in said motherboard for system data;
    wherein said first and second lines comprise lines of an Industry Standard Architecture (ISA) bus;
    a third terminal within said connector in communication with a third line in said motherboard for keyboard interrupts;
    a fourth terminal, within said connector, in communication with a fourth line in said motherboard for real-time-clock interrupts, such that said motherboard may receive said realtime-clock interrupts via said connector, a startup program of said data processing system may boot to an operating system that requires real-time-clock data to operate, and said operating system may be utilized to test said motherboard;
    wherein said first, second, third, and fourth terminals comprise respective first, second, third and fourth pads, such that a testing device may be placed into contact with said first, second, third, and fourth pads and utilized to perform diagnostics on said motherboard, irrespective of other keyboard interfaces of said motherboard; and
    wherein said connector resides on a surface of said motherboard and occupies less than one-half of one square inch of said surface.

2. A data processing system comprising:
    a connector for a motherboard for a data processing system;
    a first terminal within said connector in communication with a first line in said motherboard for serial port interrupts;
    a second terminal within said connector in communication with a second line in said motherboard for system data;
    wherein said first and second lines comprise lines of an Industry Standard Architecture (ISA) bus;
    a third terminal within said connector in communication with a third line in said motherboard for keyboard interrupts;
    a fourth terminal, within said connector, in communication with a fourth line in said motherboard for real-time-clock interrupts such that said motherboard may receive said realtime-clock interrupts via said connector, a startup program of said data processing system may boot to an operating system that requires real-time-clock data to operate, and said operating system may be utilized to test said motherboard;
    processing resources and facilities for receiving, storing, and outputting information;
    a startup program stored in said facilities for storing information;
    wherein said motherboard connects said connector, said processing resources, and said facilities for receiving, storing, and outputting information, such that said processing resources begin executing said startup program when said motherboard is turned on, and such that an input device in communication with said connector may be utilized to interact with said startup program;
    a keyboard in communication with said connector, wherein said keyboard may be utilized to interact with said startup program irrespective of other keyboard interfaces of said data processing system;
    a serial port in communication with said connector such that said startup program may interact with a serial device connected to said serial port, irrespective of other serial ports of said data processing system; and
    wherein:
    said connector comprises an expansion slot,
    said data processing system further comprises a mezzanine board with a first portion configured to be received in said expansion slot and a second portion confined to receive a conventional expansion card having a keyboard port and a serial port; and
    said keyboard is connected to said keyboard port, and said serial device is connected to said serial port, such that said keyboard and said serial device many be utilized to interact with said startup program;
    said mezzanine board comprises a fifth terminal for keyboard interrupts in communication with said third terminal for keyboard interrupts; and
    said data processing system further comprises a link between said conventional expansion card and said fifth terminal, such that keyboard interrupts are carried from said conventional expansion card to said motherboard via said link and said connector.

3. A data processing system according to claim 2, wherein:
    said startup program is an auxiliary startup program; and
    said facilities for storing information comprise a removable data storage device containing said auxiliary startup program, such that said processing resources will begin executing said auxiliary startup program if said motherboard is turned on, irrespective of a default startup program stored in said facilities for storing information.

4. A data processing system according to claim 2, wherein said second portion is configured to accept an Industry Standard Architecture (ISA) expansion card.

5. A data processing system according to claim 3, wherein said removable data storage device comprises a compact flash card.

6. A data processing system according to claim 4, wherein said connector resides on a surface of said motherboard and occupies less than one-half of one square inch of said surface.

7. A data processing system comprising:
    processing resources, facilities for receiving, storing, and outputting information, a motherboard connecting said processing resources and said facilities for receiving, storing, and outputting information, and an auxiliary startup program stored in said facilities for storing information;

an expansion slot residing on a surface of said motherboard, said expansion slot having a width of no more than one half of one inch, a length of no more than one inch, and a height of no more than three-fourths of an inch, said expansion slot being oriented so that said width and said length both lie generally parallel to said surface;

first, second, third, and fourth terminals, within said connector, in respective communication with first second, third, and fourth lines in said motherboard for serial port interrupts, input data, keyboard interrupts, and real-time-clock interrupts, respectively;

an Industry Standard Architecture (ISA) expansion card having a keyboard port and a serial port;

a mezzanine board with a first portion received by said expansion slot and a second portion receiving said ISA expansion card;

a fifth terminal on said mezzanine board in communication with said third terminal for keyboard interrupts; and a link between said ISA expansion card and said fifth terminal, such that keyboard interrupts are carried from said ISA expansion card to said motherboard via said link and said connector, and such that a keyboard and a serial device connected to said ISA expansion card may be utilized to interact with said auxiliary startup program, irrespective of other keyboard interfaces and serial ports of said data processing system.

8. A method for testing data processing system components comprising:

providing a motherboard that has processing resources, facilities for receiving, storing, and outputting information, and a connector including first, second, and third terminals in respective communication with first, second, and third lines in said motherboard for serial port interrupts, input data, and keyboard interrupts, respectively, wherein said facilities for storing information contain a startup program;

connecting at least one testing device to said connector;

executing said startup program; and utilizing said at least one testing device to interact with said startup program via said connector; and wherein:
said connector comprises a fourth terminal in communication with a fourth line in said motherboard for real-time-clock interrupts; and
said method further comprises:
transmitting said real-time-clock interrupts to said motherboard via said connector;
booting to an operating system that requires real-time-clock data to operate; and
utilizing said operating system to test said motherboard;

said at least one testing device comprises a keyboard;

said step of connecting at least one testing device to said connector comprises linking said keyboard to said connector; and said step of utilizing said at least one testing device to interact with said startup program comprises utilizing said keyboard to interact with said startup program;

said at least one testing device also comprises a serial device;

said step of connecting at least one testing device to said connector also comprises linking said serial device to said connector;

said step of utilizing said at least one testing device to interact with said startup program comprises utilizing said keyboard and said serial device to interact with said startup program;

said connector comprises an expansion slot;

said method former comprises connecting, to said expansion slot, a mezzanine board that has a first portion configured to be received by said expansion slot and a second portion configured to receive a conventional expansion card featuring a keyboard port and a serial port;

said step of connecting at least one testing device to said connector comprises connecting said conventional expansion card to said mezzanine board;

said steps of linking said keyboard and said serial device to said connector respectively comprise connecting said keyboard to said keyboard port and connecting said serial device to said serial port;

said step of utilizing said at least one testing device to interact with said startup program comprises utilizing said keyboard and said serial device to interact with said startup program;

said mezzanine board comprises a fifth terminal in communication with said third terminal for keyboard interrupts;

said conventional expansion board comprises an output terminal for keyboard interrupts; and said step of connecting at least one testing device to said connector further comprises operatively connecting said output terminal and said fifth terminal.

9. A method according to claim 8, wherein:

said first, second, third, and fourth terminals comprise first, second, third, and fourth pads, respectively;

said at least one testing device comprises a test jig; and said step of connecting at least one testing device to said connector comprises placing said test jig into contact with said first, second, third, and fourth pads.

* * * * *